US010277865B2

(12) United States Patent
Xue

(10) Patent No.: US 10,277,865 B2
(45) Date of Patent: *Apr. 30, 2019

(54) DATA TRANSMISSION METHOD AND SYSTEM, AND RELATED DEVICES

(71) Applicant: Tencent Technology (Shenzhen) Company Limited, Shenzhen (CN)

(72) Inventor: Di Xue, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/024,102

(22) Filed: Jun. 29, 2018

(65) Prior Publication Data
US 2018/0316891 A1    Nov. 1, 2018

Related U.S. Application Data

(63) Continuation of application No. 15/709,283, filed on Sep. 19, 2017, now Pat. No. 10,044,978, which is a (Continued)

(30) Foreign Application Priority Data
Aug. 28, 2015  (CN) .......................... 2015 1 0543206

(51) Int. Cl.
H04N 7/14   (2006.01)
H04N 7/15   (2006.01)
H04L 12/18  (2006.01)

(52) U.S. Cl.
CPC .......... H04N 7/147 (2013.01); H04L 12/185 (2013.01); H04N 7/15 (2013.01)

(58) Field of Classification Search
USPC ................................................ 709/204, 231
See application file for complete search history.

(56) References Cited

U.S. PATENT DOCUMENTS 5,821,985 A * 10/1998 Iizawa ................ H04M 3/567
                                                    348/14.09
8,085,290 B2 * 12/2011 Graham ................ H04N 7/15
                                                    348/14.01
(Continued)

FOREIGN PATENT DOCUMENTS

CN    101610165 A    12/2009
CN    102811335 A    12/2012
CN    103780402 A     5/2014

OTHER PUBLICATIONS

Tencent Technology, ISRWO, PCT/CN2016/083482, dated Sep. 1, 2016, 8 pgs.
(Continued)

Primary Examiner — Maria El-Zoobi
(74) Attorney, Agent, or Firm — Morgan, Lewis & Bockius LLP

(57) ABSTRACT

A data transmission method is performed at a data transmission system, including: receiving, by a transit device, audio/video data sent by a target client terminal that is in a target communication channel and has an audio/video upstream authority; forwarding, by the transit device, the audio/video data to a broadcast proxy device in the target communication channel, the broadcast proxy device being connected to at least one second client terminal that is in the target communication channel and does not have an audio/video upstream authority; and forwarding, by the broadcast proxy device, the audio/video data to each second client terminal in a corresponding downstream transmission mode according to network quality information of the second client terminal, the network quality information of each
(Continued)

second client terminal being collected by the broadcast proxy device in advance.

20 Claims, 7 Drawing Sheets

Related U.S. Application Data continuation-in-part of application No. PCT/CN2016/083482, filed on May 26, 2016.

(56) References Cited

U.S. PATENT DOCUMENTS

| | | | |
|---|---|---|---|
| 8,243,117 B2* | 8/2012 | Ali | H04N 7/148 348/14.01 |
| 9,426,304 B2* | 8/2016 | Biage | H04M 3/00 |
| 9,912,906 B2* | 3/2018 | Asai | H04L 12/1813 |
| 2008/0034104 A1* | 2/2008 | Kariti | G06Q 10/10 709/231 |

OTHER PUBLICATIONS

Tencent Technology, IPRP, PCT/CN2016/083482, dated Mar. 6, 2018, 7pgs.

\* cited by examiner

DATA TRANSMISSION METHOD AND SYSTEM, AND RELATED DEVICES

RELATED APPLICATIONS

This application is a continuation of U.S. application Ser. No. 15/709,283, entitled "DATA TRANSMISSION METHOD AND SYSTEM AND RELATED DEVICE" filed on Sep. 19, 2017, which is a continuation-in-part application of PCT/CN2016/083482, entitled "DATA TRANSMISSION METHOD AND SYSTEM AND RELATED DEVICE" filed on May 26, 2016, which claims priority to Chinese Patent Application No. 201510543206.3, filed with the State Intellectual Property Office of the People's Republic of China on Aug. 28, 2015, and entitled "DATA TRANSMISSION METHOD AND SYSTEM AND RELATED DEVICE", all of which are incorporated herein by reference in their entirety.

FIELD OF THE TECHNOLOGY

The present disclosure relates to the field of internet technology, and in particular, to a data transmission method and system, and related devices.

BACKGROUND OF THE DISCLOSURE

With prosperity and development of services such as online education, show anchoring, and live games, a real-time multi-person audio and video call service backend also bears an increasing load. For example, a real-time multi-person audio and video call service based on IM/social tool group membership has a good real-time capability and features delicate network quality control. However, in the service, a network control policy system usually needs to perform a large amount of centralized real-time calculation according to the status of each participate user, and resource consumption increases linearly with increase of a quantity of the participate users. Secondary, to guarantee good call experience, usually there are frequent broadcast notifications (such as in and out of a person skilled in the art, switch of video resource, and up/down microphone) in such the type of service, and usually expansion in the scale of an audio/video room also indicates linear increase of the quantity of the notifications. Finally, full amount/incremental data synchronization usually needs to be maintained between the network control policy system and a data forwarding system, so as to guarantee consistency of user state information in the room in such the type of service. Therefore, a backend performance bottle is extremely apt to appear in a super large scale audio/video room. In particular, when a local fault appears, a centralized broadcast effect in the super large scale audio/video room may further expand the range of affect by the fault, resulting in service instability of the whole system.

SUMMARY

Embodiments of the present disclosure provide a data transmission method and system, and related devices, capable of guaranteeing stability of a super large scale audio/video call service system.

A first aspect of the present disclosure provides a data transmission method performed at data transmission system including a transit device and a broadcast proxy device that is communicatively coupled to the transit device, each device having one or more processors and memory storing one or more programs to be executed by the one or more processors, the method, including:

receiving, by the broadcast proxy device, audio/video data sent by the transit device, the audio/video data being data sent to the transit device by a target client terminal that is in a target communication channel and has an audio/video upstream authority, and at least one second client terminal that is in the target communication channel and does not have an audio/video upstream authority being connected to the broadcast proxy device;

forwarding, by the broadcast proxy device, the audio/video data to each second client terminal in a corresponding downstream transmission mode according to network quality information of the second client terminal of the at least one second client terminal, the network quality information of the second client terminal being collected by the broadcast proxy device in advance; and the transit device being a device configured to forward the audio/video data to at least one first client terminal that is in the target communication channel and has an audio/video upstream authority and to the broadcast proxy device in the target communication channel.

A second aspect of the present disclosure provides a data transmission system including a transit device and a broadcast proxy device that is communicatively coupled to the transit device, each device having one or more processors, memory and one or more programs stored in the memory that, when executed by the one or more processors, cause the data transmission system to perform the aforementioned data transmission method.

A third aspect of the present disclosure provides a non-transitory computer readable storage medium storing one or more programs, wherein the one or more programs, when executed by a data transmission system comprising a transit device and a broadcast proxy device that is communicatively coupled to the transit device, cause the data transmission system to perform the aforementioned data transmission method.

In the embodiments of the present disclosure, a plurality of first client terminals that has an audio/video upstream authority and a target client terminal that has an audio/video upstream authority are connected to a transit device, and a plurality of second client terminals that does not have an audio/video upstream authority is connected to a broadcast proxy device, so that when the transit device receives audio/video data sent by the target client terminal, the transit device may respectively forward the audio/video data to each first client terminal and the broadcast proxy device, and the broadcast proxy device further forwards the obtained audio/video data to the second client terminals. Since the second client terminals are all managed by the broadcast proxy device, load of a network control policy system and a data forwarding system can be greatly reduced when a quantity of the second client terminals becomes relatively huge, thereby guaranteeing stability of a super large scale audio/video call service system.

BRIEF DESCRIPTION OF THE DRAWINGS

To describe the technical solutions of the embodiments of the present disclosure or the existing technology more clearly, the following briefly introduces the accompanying drawings required for describing the embodiments or the existing technology. Apparently, the accompanying drawings in the following description show only some embodiments of the present disclosure, and a person of ordinary

DESCRIPTION OF EMBODIMENTS

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

Figure 1:
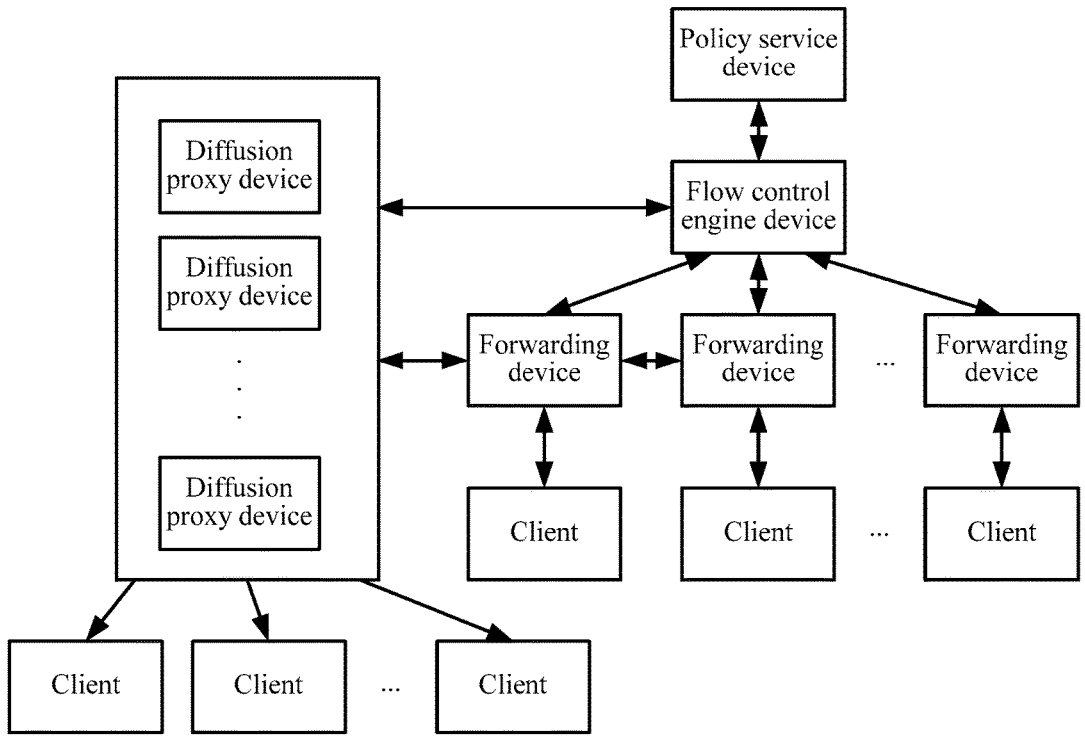
FIG. 1 is a schematic diagram of a network architecture according to some embodiments of the present disclosure.

To better understand the data transmission method and system, and related devices according to the embodiments of the present disclosure, the following first describes a network architecture applicable to the embodiments of the present disclosure. Referring to FIG. 1, FIG. 1 is a schematic diagram of a network architecture according to some embodiments of the present disclosure. As shown in FIG. 1, the network architecture may include a policy service device, a flow control engine device, a plurality of transit devices, a plurality of broadcast proxy devices, and a plurality of clients. The policy service device may communicate with the flow control engine device through a network. The flow control engine device may communicate with the plurality of transit devices and the plurality of broadcast proxy devices through a network. The plurality of transit devices may communicate with the plurality of broadcast proxy devices through a network. The plurality of transit devices may be connected to a client terminal that has an audio/video upstream authority through a network. The plurality of broadcast proxy devices may be connected to a client terminal that does not have an audio/video upstream authority through a network. The client terminal that has an audio/video upstream authority is a client capable of uploading data. The client terminal that does not have an audio/video upstream authority is a client incapable of uploading data. Each transit device manages and maintains a plurality of audio/video call channels (that is, a plurality of audio/video rooms). Different transit devices may manage and maintain the same audio/video call channel. Each broadcast proxy device also manages and maintains a plurality of audio/video call channels. Different broadcast proxy devices may manage and maintain the same audio/video call channel. One audio/video call channel may include at least one transit device, at least one broadcast proxy device, at least one client terminal that has an audio/video upstream authority, and at least one client terminal that does not have an audio/video upstream authority. The policy service device is in charge of operations such as allocation of room numbers and access addresses of data forwarding services, and security check. The flow control engine device is in charge of operations such as room management, user flow control and calculation in a room, and data synchronization. Each transit device also stores a broadcast proxy device list corresponding to each audio/video call channel maintained by the transit device. The broadcast proxy device list includes information of a broadcast proxy device in the corresponding audio/video call channel. The broadcast proxy device list stored in each transit device may be synchronized and updated by the flow control engine device. In an actual application, when one client among the clients connected to the transit devices uploads audio/video data, a transit device connected to the client may forward the audio/video data to another transit device that is in the same audio/video call channel, and forward the audio/video data to each broadcast proxy device in the same audio/video call channel, so that the transit devices in the same audio/video call channel may further respectively forward the audio/video data to clients that are connected to the transit devices and in the same audio/video call channel, and that the broadcast proxy devices in the same audio/video call channel may further respectively forward the audio/video data to clients that are connected to the broadcast proxy devices and in the same audio/video call channel.

Figure 2:
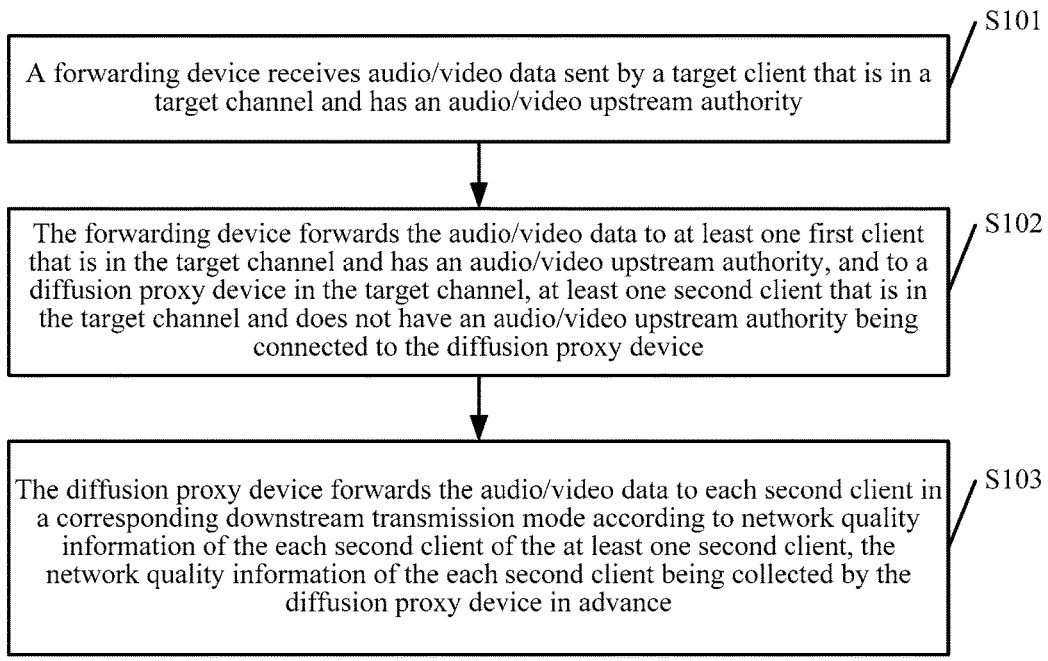
FIG. 2 is a schematic flowchart of a data transmission method according to some embodiments of the present disclosure.

Referring to FIG. 2, FIG. 2 is a schematic flowchart of a data transmission method performed at data transmission system including a transit device and a broadcast proxy device that is communicatively coupled to the transit device according to some embodiments of the present disclosure. The method may include:

S101: A transit device receives audio/video data sent by a target client terminal that is in a target communication channel and has an audio/video upstream authority.

Specifically, a transit device may receive audio/video data sent by a target client terminal that is in a target communication channel and has an audio/video upstream authority. The transit device may be a transit device in the network structure corresponding to FIG. 1. The target client terminal may be a client of a plurality of clients that is connected to the transit device, is in the same target communication channel, and has an audio/video upstream authority. The target communication channel is a client of at least one audio/video call channel.

S102: The transit device forwards the audio/video data to at least one first client terminal that is in the target communication channel and has an audio/video upstream authority, and to a broadcast proxy device in the target communication channel, the broadcast proxy device being connected to at least one second client terminal that is in the target communication channel and does not have an audio/video upstream authority.

Specifically, after the transit device receives the audio/video data, the transit device may forward the audio/video data to at least one first client terminal that is in the target communication channel and has an audio/video upstream authority. The process of forwarding, by the transit device, the audio/video data to the at least one first client terminal specifically includes: forwarding, by the transit device and in a downstream transmission mode notified by the flow control engine device, the audio/video data to the at least one first client terminal that is connected to the transit device, is in the target communication channel, and has an audio/video upstream authority, and to an associated transit device, so that the associated transit device forwards the audio/video data to at least one first client terminal that is connected to the associated transit device, is in the target communication channel, and has an audio/video upstream authority, the associated transit device including another transit device in the target communication channel apart from the transit device. The transit device also forwards the received audio/video data to a broadcast proxy device in the target communication channel. At least one second client terminal that is in the target communication channel and does not have an audio/video upstream authority is connected to the broadcast proxy device. The downstream transmission mode notified by the flow control engine device to the transit device and the associated transit device is determined according to network quality information of the at least one first client terminal collected in advance. For example, the transit device and the associated transit device may directly forward complete audio/video data to a first client terminal in a relatively smooth network, or may also forward the audio/video data to a first client terminal in a network having weak signals by means of frame skip. The network quality information may include statistics information such as a packet loss rate and delay information. There may be a plurality of the associated transit devices and a plurality of the broadcast proxy devices.

Before operation S101, the method further includes:

The transit device receives a first access request sent by the target client terminal, and completes connection with the target client terminal according to the first access request, the first access request being generated by the target client terminal according to an address of the transit device allocated by the policy service device, and the address of the transit device being allocated by the policy service device when the policy service device detects that the target client terminal has an audio/video upstream authority.

The broadcast proxy device receives a second access request sent by each second client terminal and completes connection with each second client terminal according to the second access request, the second access request being generated by each second client terminal according to an address of the broadcast proxy device allocated by the policy service device, and the address of the broadcast proxy device being allocated by the policy service device when the policy service device detects that each second client terminal does not have an audio/video upstream authority. The address of the transit device obtained by the at least one first client terminal connected to the transit device is also allocated by the policy service device. The address of the associated transit device obtained by the at least one first client terminal connected to the associated transit device is also allocated by the policy service device.

S103: The broadcast proxy device forwards the audio/video data to each second client terminal in a corresponding downstream transmission mode according to network quality information of the second client terminal, the network quality information of each second client terminal being collected by the broadcast proxy device in advance.

Specifically, after the transit device sends the audio/video data to the broadcast proxy devices in the target communication channel, each broadcast proxy device in the target communication channel may respectively send, in a corresponding downstream transmission mode according to the network quality information corresponding to each second client terminal, the audio/video data to each second client terminal connected to the broadcast proxy device. For example, it is assumed that a second client terminal A and a second client terminal B are connected to one broadcast proxy device in the target communication channel. If the broadcast proxy device senses that the network of the second client terminal A is relatively smooth, the broadcast proxy device may forward complete audio/video data to the second client terminal A. Meanwhile, if the broadcast proxy device senses that the network of the second client terminal B is not stable, the broadcast proxy device may forward audio/video data to the second client terminal B by means of frame skip. The broadcast proxy device may collect network quality information of each second client terminal regularly. As the network quality information of each second client terminal is reported to the broadcast proxy device and the flow control engine device needs to collect only network quality information of the first client terminal and the target client terminal, load of the flow control engine device can be further alleviated.

In the embodiments of the present disclosure, a plurality of first client terminals that has an audio/video upstream authority and a target client terminal that has an audio/video upstream authority are connected to a transit device, and a plurality of second client terminals that does not have an audio/video upstream authority is connected to a broadcast proxy device, so that when the transit device receives audio/video data sent by the target client terminal, the transit device may respectively forward the audio/video data to each first client terminal and the broadcast proxy device, and the broadcast proxy device further forwards the obtained audio/video data to the second client terminals. Since the second client terminals are all managed by the broadcast proxy device, load of a network control policy system and a data forwarding system can be greatly reduced when a quantity of the second client terminals becomes relatively huge, thereby guaranteeing stability of a super large scale audio/video call service system.

Figure 3:
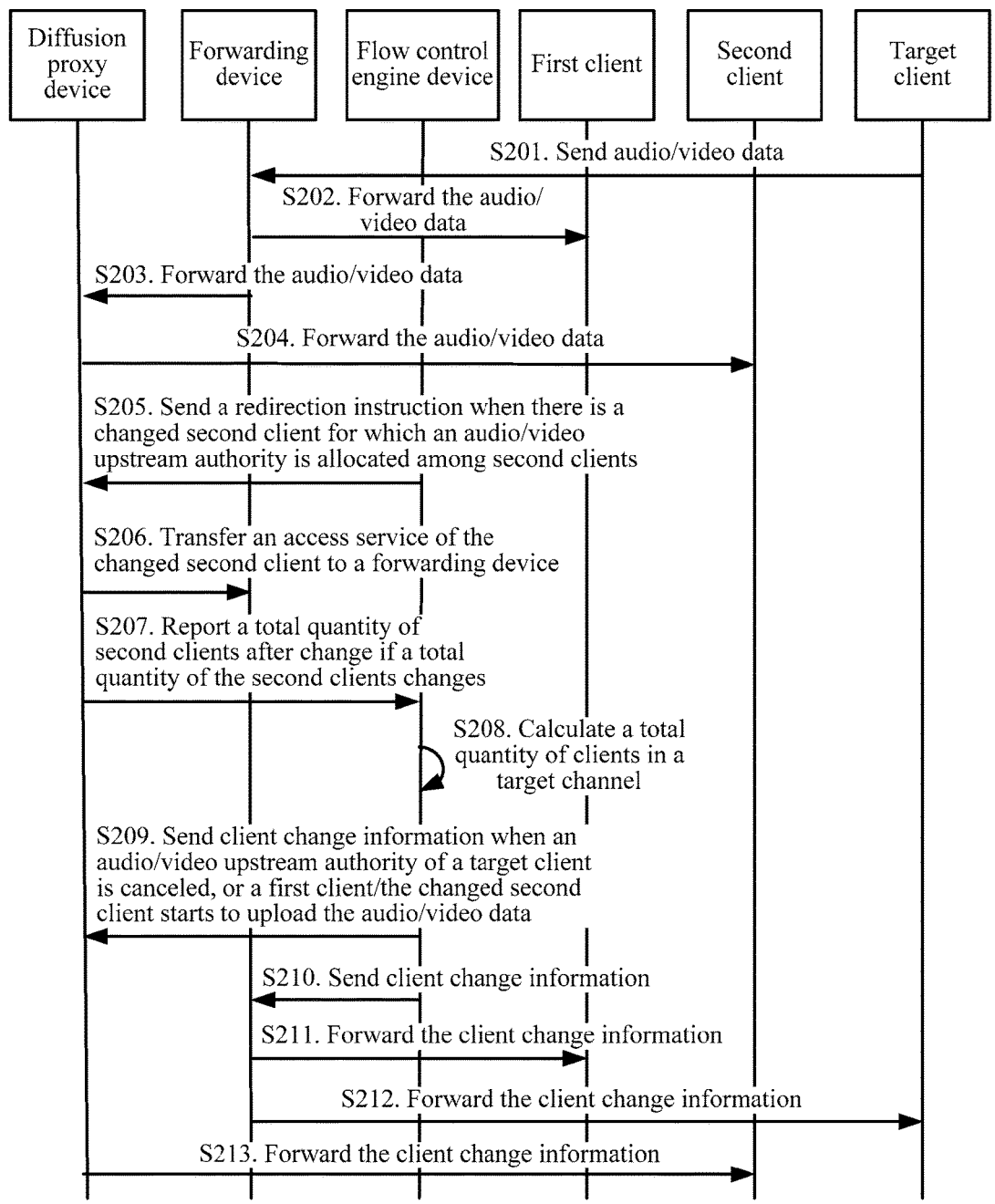
FIG. 3 is a schematic timing diagram of a data transmission method according to some embodiments of the present disclosure.

Further referring to FIG. 3, FIG. 3 is a schematic timing diagram of a data transmission method according to some embodiments of the present disclosure. In this embodiment of the present disclosure, the specific process of the data transmission method is illustrated from the sides of a transit device, a broadcast proxy device, a flow control engine device, a first client terminal, a second client terminal, and a target client terminal together.

S201: The target client terminal sends audio/video data to the transit device.

Specifically, the target client terminal may be a client terminal that is in the target communication channel and has an audio/video upstream authority. The target client terminal is connected to the transit device. The transit device may be a transit device in the network structure corresponding to FIG. 1. The target client terminal may be a client in a plurality of clients that is in the target communication channel and has an audio/video upstream authority. The target communication channel is a client of at least one audio/video call channel.

S202: The transit device forwards the audio/video data to the first client terminal.

Specifically, after the transit device receives the audio/video data, the transit device may forward the audio/video data to at least one first client terminal that is in the target communication channel and has an audio/video upstream authority. The process of forwarding, by the transit device, the audio/video data to the at least one first client terminal specifically includes: forwarding, by the transit device and in a downstream transmission mode notified by the flow control engine device, the audio/video data to the at least one first client terminal that is connected to the transit device, is in the target communication channel, and has an audio/video upstream authority, and to an associated transit device, so that the associated transit device forwards the audio/video data to at least one first client terminal that is connected to the associated transit device, is in the target communication channel, and has an audio/video upstream authority, the associated transit device including another transit device in the target communication channel apart from the transit device. The downstream transmission mode notified by the flow control engine device to the transit device and the associated transit device is determined according to network quality information of the at least one first client terminal collected in advance. For example, the transit device and the associated transit device may directly forward complete audio/video data to a first client terminal in a relatively smooth network, or may also forward the audio/video data to a first client terminal in a network having weak signals by means of frame skip. There may be a plurality of associated transit devices.

S203: The transit device forwards the audio/video data to the broadcast proxy device.

Specifically, operation S203 and operation S202 may be performed synchronously. That is, the transit device may also forward the audio/video data to the broadcast proxy device while forwarding the audio/video data to the first client terminal. At least one second client terminal that is in the target communication channel and does not have an audio/video upstream authority is connected to the broadcast proxy device. There may be a plurality of the broadcast proxy devices.

S204: The broadcast proxy device forwards the audio/video data to the second client terminal.

Specifically, after the transit device sends the audio/video data to the broadcast proxy devices in the target communication channel, each broadcast proxy device in the target communication channel may respectively send, in a corresponding downstream transmission mode according to the network quality information corresponding to each second client terminal, the audio/video data to each second client terminal connected to the broadcast proxy device. For example, it is assumed that a second client terminal A and a second client terminal B are connected to one broadcast proxy device in the target communication channel. If the broadcast proxy device senses that the network of the second client terminal A is relatively smooth, the broadcast proxy device may forward complete audio/video data to the second client terminal A. Meanwhile, if the broadcast proxy device senses that the network of the second client terminal B is not stable, the broadcast proxy device may forward audio/video data to the second client terminal B by means of frame skip. The broadcast proxy device may collect network quality information of each second client terminal regularly. As the network quality information of each second client terminal is reported to the broadcast proxy device and the flow control engine device needs to collect only network quality information of the first client terminal and the target client terminal, load of the flow control engine device can be further alleviated.

S205: The flow control engine device sends a redirection instruction to the broadcast proxy device when there is a second client terminal for which an audio/video upstream authority is allocated among the second client terminals.

S206: The broadcast proxy device transfers an access service of the changed second client terminal to the transit device according to the redirection instruction.

Specifically, operation S205 and operation S206 may be performed at any time. When it is detected that there is a second client terminal for which an audio/video upstream authority is allocated among the plurality of second client terminals, the flow control engine device sends a redirection instruction to the broadcast proxy device, so that the broadcast proxy device transfers, according to the redirection instruction, an access service of the changed second client terminal to the transit device, and the transit device may establish a connection relationship with the changed second client terminal. The broadcast proxy device itself does not have an upstream data forwarding function, a user of the broadcast proxy device needs to be redirected to a data transit device when the user of the broadcast proxy device acquires an upstream data authority (in scenarios such as anchor microphone control, and roll call by a teacher and question answering by a student). For example, a first client terminal is a user "teacher", and a second client terminal is a user "student". When the user "teacher" wants to call the name of the user "student" to answer a question, the first client terminal may send a message to instruct the flow control engine device to send a redirection instruction to a broadcast proxy device to which the second client terminal is connected, so as to enable the audio/video upstream authority of the second client terminal and reconnect the second client terminal to a corresponding transit device. The implementation manner of redirecting the second client terminal may include: the second client terminal again performs the process of policy application, allocation, and access, or a backend finds the information and puts the information in the redirection instruction in advance. No matter which implementation manner is used, the flow control engine device needs to acquire an authority of the redirected user from the service backend and allocates a suitable access service according to the authority of the user. In the present disclosure, not only the second client terminal can be redirected to the transit device, but also the first client terminal/target client terminal can be redirected to the broadcast proxy device.

The redirection process is not sensible for the user. That is, the redirected first client terminal/second client terminal/target client terminal needs to hide the redirection process by means of smooth processing. For example, the second client terminal does not disconnect a channel with the broadcast proxy device until a channel with the transit device is established and data can be sent and received by means of the channel with the transit device.

S207: The broadcast proxy device reports to the flow control engine device a total quantity of second client terminals after change, after a total quantity of the second client terminals changes.

S208: The flow control engine device calculates a total quantity of client terminals in the target communication channel.

Specifically, operation S207 and operation S208 may be performed at any time. When the total quantity of the second client terminals changes, it indicates that a new second client terminal has accessed the broadcast proxy device, or a second client terminal is disconnected from the broadcast proxy device. In this case, the broadcast proxy device may report to the flow control engine device the total quantity of second client terminals after change, so that the flow control engine device may calculate the total quantity of client terminals in the target communication channel according to the reported total quantity of second client terminals, the total quantity of the target client terminals and the first client terminals. That is, the total quantity of client terminals in the target communication channel is the sum of the quantities of the second client terminals, the first client terminals, and the target client terminals. By using the reported total quantity of second client terminals after change, the flow control engine device may be enabled to sense a change in a total quantity of individuals in the target communication channel.

S209: The flow control engine device sends client change information to the broadcast proxy device when the audio/video upstream authority of the target client terminal is canceled, or the first client terminal starts to upload the audio/video data, or the changed second client terminal starts to upload the audio/video data.

S210: The flow control engine device sends the client change information to the transit device.

S211: The transit device forwards the client change information to the first client terminal.

S212: The transit device forwards the client change information to the target client terminal.

S213: The broadcast proxy device forwards the client change information to the second client terminal.

Specifically, operation S209 to operation S213 may be performed at any time. When the audio/video upstream authority of the target client terminal is canceled, or the first client terminal starts to upload the audio/video data, or the changed second client terminal starts to upload the audio/video data, the flow control engine device may send the client change information to the broadcast proxy device and the transit device in the target communication channel, so that the broadcast proxy device may forward the client change information to the target client terminal, the first client terminal and the changed second client terminal, and that the target client terminal, the first client terminal and the changed second client terminal may learn about the status of a client terminal that has an audio/video upstream authority in the target communication channel. The changed second client terminal may be the changed second client terminal in operation S205 and operation S206. The client change information may include at least one of information about the target client terminal of which the audio/video upstream authority is canceled, information about the first client terminal that starts to upload the audio/video data, and information about the changed second client terminal that starts to upload the audio/video data. The flow control engine device may also send the client change information to an associated transit device, so that the associated transit device also forwards the client change information to the first client terminal that is connected to the associated transit device. For example, when a user that only performs listening/watching (that is, the second client terminal) acquires an authority of uploading data, completes redirection, and actually starts to upload audio/video data by means of the transit device, the flow control engine device needs to broadcast the client change information in an audio/video call room (that is, the target communication channel) where the user is, so as to notify all users in the audio/video call room of the client change information, so that all of the users are informed of that there is new audio/video data for subscription. The specific broadcast manner is: the flow control engine device sends the client change information to the corresponding transit device and the corresponding broadcast proxy device, so that the corresponding transit device and the corresponding broadcast proxy device further forward the client change information to the corresponding clients. Optionally, the subscription operation may be skipped. New upstream data is directly pushed to all of the clients in the audio/video call room, so that all of the clients sense a new data source according to a change in the data. Still for example, when there is a target client terminal currently uploading audio/video data no longer uploads data due to reasons such as canceling of the audio/video upstream authority or disconnecting of connection, the flow control engine device is responsible for broadcasting the client change information to all of the users in the target communication channel (including the first client terminals, the second client terminals, and the target client terminal), so that the clients give friendly prompts to the users.

Optionally, notifications of the status of the first client terminal and the target client terminal are all sent by broadcasting. Packet loss or network abnormal may appear in the transmission process, resulting in that some broadcast proxy devices and/or some transit devices cannot receive the notifications. Therefore, the flow control engine device needs to regularly broadcast the status of all of the first client terminals and the target client terminals to all of the broadcast proxy devices and the transit devices that maintain the target communication channel, so as to resolve the problem of status inconsistency brought about by accidental notification loss.

In the embodiments of the present disclosure, a plurality of first client terminals that has an audio/video upstream authority and a target client terminal that has an audio/video upstream authority are connected to a transit device, and a plurality of second client terminals that does not have an audio/video upstream authority is connected to a broadcast proxy device, so that when the transit device receives audio/video data sent by the target client terminal, the transit device may respectively forward the audio/video data to each first client terminal and the broadcast proxy device, and the broadcast proxy device further forwards the obtained audio/video data to the second client terminals. Since the second client terminals are all managed by the broadcast proxy device, load of a network control policy system and a data forwarding system can be greatly reduced when a quantity of the second client terminals becomes relatively huge, thereby guaranteeing stability of a super large scale audio/video call service system.

Figure 4:
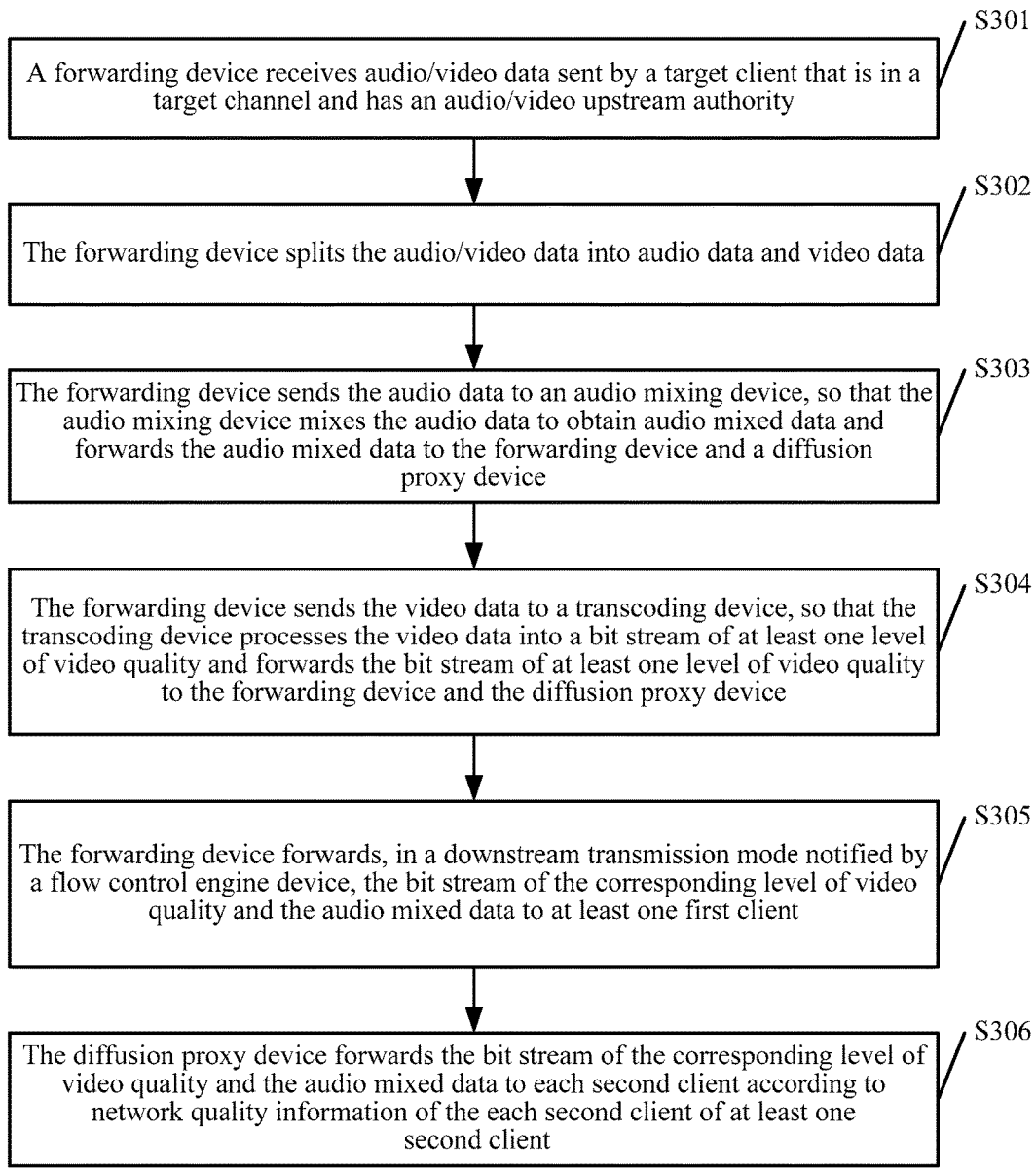
FIG. 4 is a schematic flowchart of another data transmission method according to some embodiments of the present disclosure.

Further referring to FIG. 4, FIG. 4 is a schematic flowchart of another data transmission method according to some embodiments of the present disclosure. The method may include:

S301: A transit device receives audio/video data sent by a target client terminal that is in a target communication channel and has an audio/video upstream authority.

Specifically, a transit device may receive audio/video data sent by a target client terminal that is in a target communication channel and has an audio/video upstream authority. The transit device may be a transit device in the network structure corresponding to FIG. 1. The target client terminal may be a client of a plurality of clients that is connected to the transit device, is in the same target communication channel, and has an audio/video upstream authority. The target communication channel is a client of at least one audio/video call channel.

S302: The transit device splits the audio/video data into audio data and video data.

S303: The transit device sends the audio data to an audio mixing device, so that the audio mixing device mixes the audio data to obtain audio mixed data and forwards the audio mixed data to the transit device and a broadcast proxy device.

Specifically, the transit device sends the audio data to an audio mixing device, so that the audio mixing device mixes the audio data to obtain audio mixed data and forwards the audio mixed data to the transit device and the broadcast proxy device. The audio mixing device also forwards the audio mixed data to the associated transit device. The associated transit device includes another transit device in the target communication channel apart from the transit device.

S304: The transit device sends the video data to a transcoding device, so that the transcoding device processes the video data into a bit stream of at least one level of video quality and forwards the bit stream of at least one level of video quality to the transit device and the broadcast proxy device.

Specifically, S303 and S304 may be performed simultaneously. The transit device sends the video data to the transcoding device, so that the transcoding device processes the video data into a bit stream of at least one level of video quality and forwards the bit stream of at least one level of video quality to the transit device and the broadcast proxy device. The transcoding device also forwards the bit stream of at least one level of video quality to the associated transit device. The bit stream of at least one level of video quality may include a bit stream of a plurality of code rates or a bit stream of a plurality of resolutions.

S305: The transit device forwards, in a downstream transmission mode notified by the flow control engine device, the bit stream of the corresponding level of video quality and the audio mixed data to at least one first client terminal.

Specifically, the transit device may forward, in a downstream transmission mode notified by the flow control engine device, the bit stream of the corresponding level of video quality and the audio mixed data to the at least one first client terminal. The associated transit device may also forward, in a downstream transmission mode notified by the flow control engine device, the bit stream of the corresponding level of video quality and the audio mixed data to the first client terminal connected to the associated transit device. The downstream transmission mode notified by the flow control engine device to the transit device and the associated transit device is determined according to network quality information of the at least one first client terminal collected in advance. For example, a first client terminal A and a first client terminal B are connected to the transit device. If a network corresponding to the first client terminal A is relatively smooth, the corresponding downstream transmission mode may be a bit stream of a high code rate. In this case, the transit device forwards the bit stream of a high code rate and the audio mixed data to the first client terminal A. Meanwhile, if the quality of a network corresponding to the first client terminal B is relatively poor, the corresponding downstream transmission mode may be a bit stream of a low code rate. In this case, the transit device forwards the bit stream of a low code rate and the audio mixed data to the first client terminal B.

S306: The broadcast proxy device forwards the bit stream of the corresponding level of video quality and the audio mixed data to each second client terminal according to network quality information of each second client terminal of at least one second client terminal.

Specifically, S305 and S306 may be performed simultaneously. The broadcast proxy device forwards the bit stream of the corresponding level of video quality and the audio mixed data to each second client terminal according to the network quality information of each second client terminal of the at least one second client terminal. The network quality information of each second client terminal is regularly collected by the broadcast proxy device. For example, a second client terminal A and a second client terminal B are connected to the broadcast proxy device. If a network corresponding to the second client terminal A is relatively smooth, the broadcast proxy device forwards a bit stream of a high code rate and the mixed data to the second client terminal A. Meanwhile, if the quality of a network corresponding to the second client terminal B is relatively poor, the broadcast proxy device forwards a bit stream of a low code rate and the audio mixed data to the second client terminal B. As the network quality information of all the second client terminals is reported to the broadcast proxy device and the flow control engine device needs to collect only network quality information of the first client terminal and the target client terminal, load of the flow control engine device can be further alleviated. By mixing the audio data, a part of downstream traffic can be saved for the clients.

Optionally, after the transit device sends the audio data and the video data to the transcoding device and the audio mixing device, the transit device may further send a recording and streaming request to the transcoding device, so that the transcoding device acquires the audio mixed data, encapsulates the audio mixed data and the bit stream of at least one level of video quality into streaming media information, and sends the streaming media information to a recording and storage server and/or a content delivery network (CDN) according to the recording and streaming request. The format of the streaming media information may include TS, MP4, FLV, or the like. By means of connection to the CDN and the storage server, the audio/video call service system of the present disclosure can go beyond the restriction of original real-time call services, and can better serve services that require recording of audio/video data (for example, bank, customer service), and services that are capable of tolerating time delay but required to be watched by means of a Web (for example, live broadcast and education).

By this embodiment of the present disclosure, the original real-time multi-person audio and video call service system may still retain a small room management mode, an upper limit supported by a single room is extended greatly by means of parallel extending, meanwhile impact on the existing architecture is made the smallest, and the risks are controllable. In addition, by means of the functions of the audio mixing device and the transcoding device, the downstream channel quality control capability and the multi-client watching coverage and backend recording capability can be further improved, so as to further guarantee stability of the large scale audio/video call service system.

Figure 5:
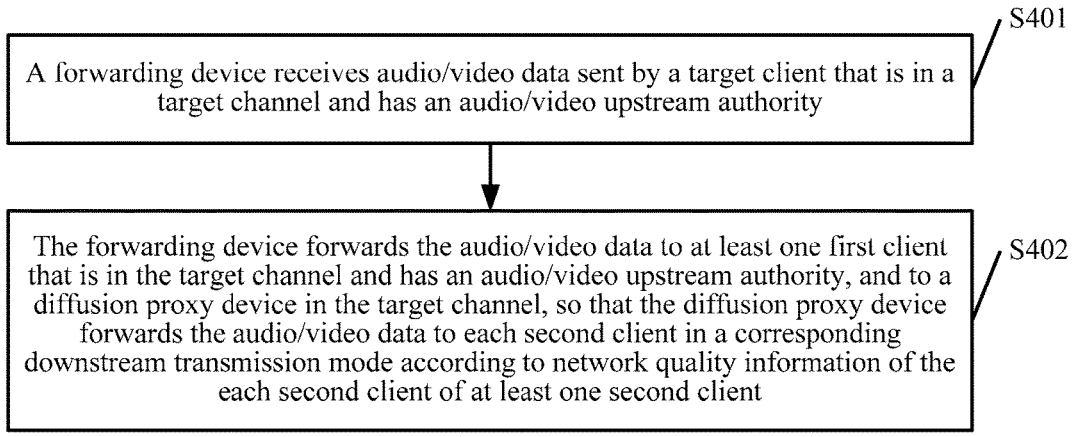
FIG. 5 is a schematic flowchart of still another data transmission method according to some embodiments of the present disclosure.

Further referring to FIG. 5, FIG. 5 is a schematic flowchart of still another data transmission method according to some embodiments of the present disclosure. The method may include:

S401: A transit device receives audio/video data sent by a target client terminal that is in a target communication channel and has an audio/video upstream authority.

S402: The transit device forwards the audio/video data to at least one first client terminal that is in the target communication channel and has an audio/video upstream authority, and to a broadcast proxy device in the target communication channel, so that the broadcast proxy device forwards the audio/video data to each second client terminal in a corresponding downstream transmission mode according to network quality information of each second client terminal of at least one second client terminal.

The at least one second client terminal is a client terminal that is connected to the broadcast proxy device, is in the target communication channel, and does not have an audio/video upstream authority. The network quality information of each second client terminal is collected by the broadcast proxy device in advance.

The specific implementation manner of operation S401 and operation S402 may be referred to in the description of the transit device in the foregoing embodiment corresponding to FIG. 2, or the description of the transit device in the foregoing embodiment corresponding to FIG. 3, and is not further described herein.

Optionally, the transit device receives client change information sent by a flow control engine device when the audio/video upstream authority of the target client terminal is canceled, or the first client terminal starts to upload the audio/video data, or the changed second client terminal starts to upload the audio/video data, the client change information being state change information of a client terminal that has an audio/video upstream authority.

The transit device forwards the client change information to the target client terminal, the at least one first client terminal, and the changed second client terminal.

The changed second client terminal is a second client terminal for which an audio/video upstream authority is allocated.

The process of forwarding the client change information may specifically refer to S209 to S213 in the foregoing embodiment corresponding to FIG. 3, and is not further described herein.

Optionally, the transit device maintains at least one audio/video call channel, and stores a broadcast proxy device list respectively corresponding to each audio/video call channel of the at least one audio/video call channel.

The at least one audio/video call channel includes at least the target communication channel, and the broadcast proxy device list includes an address of the broadcast proxy device.

Optionally, operation S402 may include:

The transit device splits the audio/video data into audio data and video data.

The transit device sends the audio data to an audio mixing device, so that the audio mixing device mixes the audio data to obtain audio mixed data and forwards the audio mixed data to the transit device and the broadcast proxy device.

The transit device sends the video data to a transcoding device, so that the transcoding device processes the video data into a bit stream of at least one level of video quality and forwards the bit stream of at least one level of video quality to the transit device and the broadcast proxy device.

The transit device forwards, in a downstream transmission mode notified by the flow control engine device, the bit stream of the corresponding level of video quality and the audio mixed data to the at least one first client terminal.

The broadcast proxy device is a device configured to forward the bit stream of the corresponding level of video quality and the audio mixed data to each second client terminal according to network quality information of the second client terminal.

The specific process of forwarding, by the transit device, the audio/video data by means of the audio mixing device and the transcoding device may refer to S302 to S306 in the foregoing embodiment corresponding to FIG. 4, and is not further described herein.

Optionally, the transit device may further send a recording and streaming request to the transcoding device, so that the transcoding device acquires the audio mixed data, encapsulates the audio mixed data and the bit stream of at least one level of video quality into streaming media information, and sends the streaming media information to a recording and storage server and/or a content delivery network (CDN) according to the recording and streaming request.

Optionally, before operation S401, the transit device may receive a first access request sent by the target client terminal, and complete connection with the target client terminal according to the first access request, the first access request being generated according to an address of the transit device allocated by a policy service device, and the address of the transit device being allocated by the policy service device when the policy service device detects that the target client terminal has an audio/video upstream authority.

In the embodiments of the present disclosure, a plurality of first client terminals that has an audio/video upstream authority and a target client terminal that has an audio/video upstream authority are connected to a transit device, and a plurality of second client terminals that does not have an audio/video upstream authority is connected to a broadcast proxy device, so that when the transit device receives audio/video data sent by the target client terminal, the transit device may respectively forward the audio/video data to each first client terminal and the broadcast proxy device, and the broadcast proxy device further forwards the obtained audio/video data to the second client terminals. Since the second client terminals are all managed by the broadcast proxy device, load of a network control policy system and a data forwarding system can be greatly reduced when a quantity of the second client terminals becomes relatively huge, thereby guaranteeing stability of a super large scale audio/video call service system.

Figure 6:
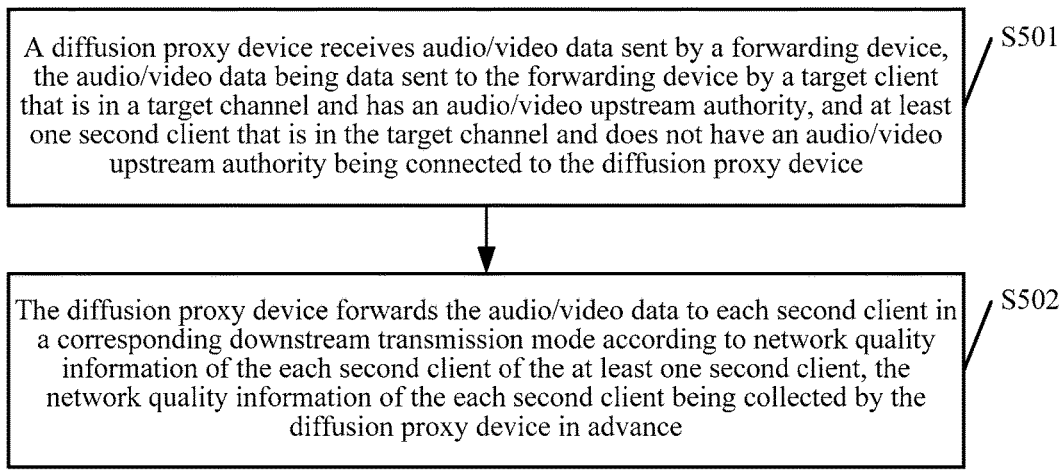
FIG. 6 is a schematic flowchart of still another data transmission method according to some embodiments of the present disclosure.

Further referring to FIG. 6, FIG. 6 is a schematic flowchart of still another data transmission method according to some embodiments of the present disclosure. The method may include S501: A broadcast proxy device receives audio/video data sent by a transit device, the audio/video data being data sent to the transit device by a target client terminal that is in a target communication channel and has an audio/video upstream authority, and the broadcast proxy device being connected to at least one second client terminal that is in the target communication channel and does not have an audio/video upstream authority.

S502: The broadcast proxy device forwards the audio/video data to each second client terminal in a corresponding downstream transmission mode according to network quality information of the second client terminal, the network quality information of each second client terminal being collected by the broadcast proxy device in advance.

The transit device is a device configured to forward the audio/video data to at least one first client terminal that is in the target communication channel and has an audio/video upstream authority and to the broadcast proxy device in the target communication channel.

The specific implementation manner of operation S501 and operation S502 may be referred to in the description of the broadcast proxy device in the foregoing embodiment corresponding to FIG. 2, or the description of the broadcast proxy device in the foregoing embodiment corresponding to FIG. 3, and is not further described herein.

Optionally, the broadcast proxy device receives a redirection instruction sent by a flow control engine device when there is a second client terminal for which an audio/video upstream authority is allocated among the at least one second client terminal.

The broadcast proxy device transfers an access service of the changed second client terminal to the transit device in the target communication channel according to the redirection instruction.

The change process of the audio/video upstream authority of the second client terminal may specifically refer to S205 to S206 in the foregoing embodiment corresponding to FIG. 3, and is not further described herein.

Optionally, the broadcast proxy device reports to a flow control engine device a total quantity of second client terminals when a total quantity of the at least one second client terminal changes, so that the flow control engine device calculates a total quantity of client terminals in the target communication channel according to the reported total quantity of second client terminals and a total quantity of the target client terminals and the at least one first client terminal.

The process of reporting the total quantity of second client terminals may specifically refer to S207 and S208 in the foregoing embodiment corresponding to FIG. 3, and is not further described herein.

Optionally, the broadcast proxy device receives client change information sent by the flow control engine device when the audio/video upstream authority of the target client terminal is canceled, or the first client terminal starts to upload the audio/video data, or the changed second client terminal starts to upload the audio/video data, the client change information being state change information of a client terminal that has an audio/video upstream authority.

The broadcast proxy device forwards the client change information to the at least one second client terminal.

The process of forwarding the client change information may specifically refer to S209 to S213 in the foregoing embodiment corresponding to FIG. 3, and is not further described herein.

Optionally, when the transit device splits the audio/video data into audio data and video data rather than directly forward the audio/video data to the broadcast proxy device, the transit device may send the audio data to an audio mixing device, so that the audio mixing device mixes the audio data to obtain audio mixed data and forwards the audio mixed data to the transit device and the broadcast proxy device. The transit device may also send the video data to a transcoding device, so that the transcoding device processes the video data into a bit stream of at least one level of video quality and forwards the bit stream of at least one level of video quality to the transit device and the broadcast proxy device. After the broadcast proxy device receives the audio mixed data and the bit stream of at least one level of video quality, the broadcast proxy device may forward the bit stream of the corresponding level of video quality and the audio mixed data to each second client terminal according to the network quality information of each second client terminal of the at least one second client terminal. The transit device may also forward, in a downstream transmission mode notified by the flow control engine device, the bit stream of the corresponding level of video quality and the audio mixed data to the at least one first client terminal.

Optionally, before operation S501, the broadcast proxy device may receive a second access request sent by each second client terminal and complete connection with each second client terminal according to the second access request, the second access request being generated by each second client terminal according to an address of the broadcast proxy device allocated by a policy service device, and the address of the broadcast proxy device being allocated by the policy service device when the policy service device detects that each second client terminal does not have an audio/video upstream authority.

In the embodiments of the present disclosure, a plurality of first client terminals that has an audio/video upstream authority and a target client terminal that has an audio/video upstream authority are connected to a transit device, and a plurality of second client terminals that does not have an audio/video upstream authority is connected to a broadcast proxy device, so that when the transit device receives audio/video data sent by the target client terminal, the transit device may respectively forward the audio/video data to each first client terminal and the broadcast proxy device, and the broadcast proxy device further forwards the obtained audio/video data to the second client terminals. Since the second client terminals are all managed by the broadcast proxy device, load of a network control policy system and a data forwarding system can be greatly reduced when a quantity of the second client terminals becomes relatively huge, thereby guaranteeing stability of a super large scale audio/video call service system.

Figure 7:
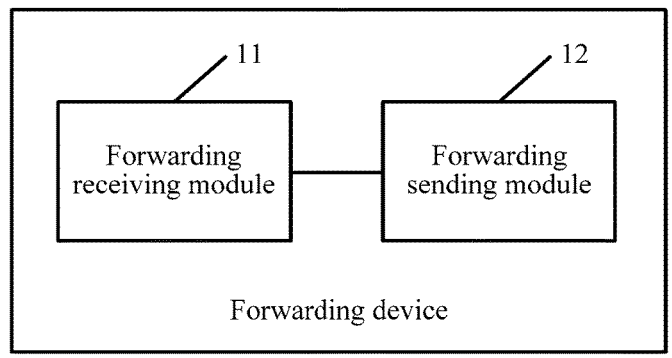
FIG. 7 is a schematic structural diagram of a transit device according to some embodiments of the present disclosure.

Referring to FIG. 7, FIG. 7 is a schematic structural diagram of a transit device according to some embodiments of the present disclosure. The transit device may include: a forwarding receiving module 11 and a forwarding sending module 12.

The forwarding receiving module 11 is configured to receive audio/video data sent by a target client terminal that is in a target communication channel and has an audio/video upstream authority.

Specifically, the forwarding receiving module 11 may receive the audio/video data sent by the target client terminal that is in the target communication channel and has an audio/video upstream authority. The target client terminal may be a client of a plurality of clients that is connected to the transit device, is in the target communication channel, and has an audio/video upstream authority. The target communication channel is a client of at least one audio/video call channel.

The forwarding sending module 12 is configured to forward the audio/video data to at least one first client terminal that is in the target communication channel and has an audio/video upstream authority, and to a broadcast proxy device in the target communication channel, so that the broadcast proxy device forwards the audio/video data to each second client terminal in a corresponding downstream transmission mode according to network quality information of each second client terminal of at least one second client terminal.

Specifically, after the forwarding receiving module 11 receives the audio/video data, the forwarding sending module 12 may forward the audio/video data to at least one first client terminal that is in the target communication channel and has an audio/video upstream authority. The process of forwarding, by the forwarding sending module 12, the audio/video data to the at least one first client terminal specifically includes: forwarding, by the forwarding sending module 12 and in a downstream transmission mode notified by the flow control engine device, the audio/video data to the at least one first client terminal that is connected to the transit device, is in the target communication channel, and has an audio/video upstream authority, and to an associated transit device, so that the associated transit device forwards the audio/video data to at least one first client terminal that is connected to the associated transit device, is in the target communication channel, and has an audio/video upstream authority, the associated transit device including another transit device in the target communication channel apart from the transit device. The forwarding sending module 12 also forwards the received audio/video data to a broadcast proxy device in the target communication channel. At least one second client terminal that is in the target communication channel and does not have an audio/video upstream authority is connected to the broadcast proxy device. The downstream transmission mode notified by the flow control engine device to the transit device and the associated transit device is determined according to network quality information of the at least one first client terminal collected in advance. For example, the forwarding sending module 12 and the associated transit device may directly forward complete audio/video data to a first client terminal in a relatively smooth network, or may also forward the audio/video data to a first client terminal in a network having weak signals by means of frame skip. The network quality information may include statistics information such as a packet loss rate and delay information. There may be a plurality of the associated transit devices and a plurality of the broadcast proxy devices.

After the forwarding sending module 12 sends the audio/video data to the broadcast proxy devices in the target communication channel, each broadcast proxy device in the target communication channel may respectively send, in a corresponding downstream transmission mode according to the network quality information corresponding to each second client terminal, the audio/video data to each second client terminal connected to the broadcast proxy device. For example, it is assumed that a second client terminal A and a second client terminal B are connected to one broadcast proxy device in the target communication channel. If the broadcast proxy device senses that the network of the second client terminal A is relatively smooth, the broadcast proxy device may forward complete audio/video data to the second client terminal A. Meanwhile, if the broadcast proxy device senses that the network of the second client terminal B is not stable, the broadcast proxy device may forward audio/video data to the second client terminal B by means of frame skip. The broadcast proxy device may collect network quality information of each second client terminal regularly. As the network quality information of each second client terminal is reported to the broadcast proxy device and the flow control engine device needs to collect only network quality information of the first client terminal and the target client terminal, load of the flow control engine device can be further alleviated.

In the embodiments of the present disclosure, a plurality of first client terminals that has an audio/video upstream authority and a target client terminal that has an audio/video upstream authority are connected to a transit device, and a plurality of second client terminals that does not have an audio/video upstream authority is connected to a broadcast proxy device, so that when the transit device receives audio/video data sent by the target client terminal, the transit device may respectively forward the audio/video data to each first client terminal and the broadcast proxy device, and the broadcast proxy device further forwards the obtained audio/video data to the second client terminals. Since the second client terminals are all managed by the broadcast proxy device, load of a network control policy system and a data forwarding system can be greatly reduced when a quantity of the second client terminals becomes relatively huge, thereby guaranteeing stability of a super large scale audio/video call service system.

Figure 8:
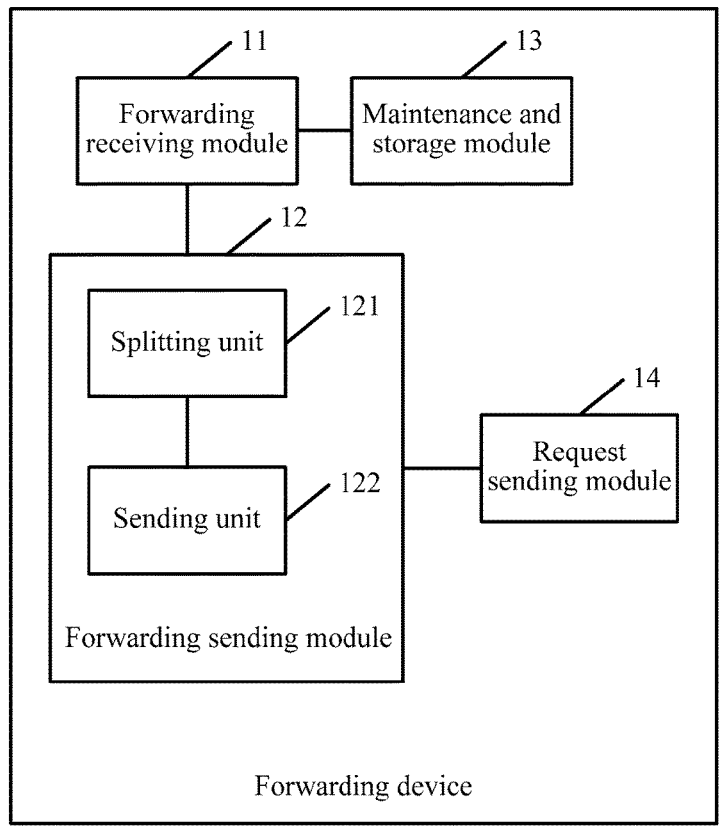
FIG. 8 is a schematic structural diagram of a transit device according to some embodiments of the present disclosure.

Further referring to FIG. 8, FIG. 8 is a schematic structural diagram of another transit device according to some embodiments of the present disclosure. The transit device may include the forwarding receiving module 11 and the forwarding sending module 12 in the foregoing embodiment corresponding to FIG. 7. Further, the transit device may also include a maintenance and storage module 13 and a request sending module 14.

The forwarding sending module 12 includes a splitting unit 121 and a sending unit 122.

The forwarding receiving module 11 is further configured to receive client change information sent by a flow control engine device when the audio/video upstream authority of the target client terminal is canceled, or the first client terminal starts to upload the audio/video data, or the changed second client terminal starts to upload the audio/video data, the client change information being state change information of a client terminal having an audio/video upstream authority.

The forwarding sending module 12 is further configured to forward the client change information to the target client terminal, the at least one first client terminal, and the changed second client terminal.

The changed second client terminal is a second client terminal for which an audio/video upstream authority is allocated.

The process of forwarding the client change information performed by the forwarding receiving module 11 and the forwarding sending module 12 may specifically refer to S209 to S213 in the foregoing embodiment corresponding to FIG. 3, and is not further described herein.

The maintenance and storage module 13 is configured to maintain at least one audio/video call channel, and store a broadcast proxy device list respectively corresponding to each audio/video call channel of the at least one audio/video call channel, where the at least one audio/video call channel includes at least the target communication channel, and the broadcast proxy device list includes an address of the broadcast proxy device.

The splitting unit 121 is configured to split the audio/video data into audio data and video data.

The sending unit 122 is configured to send the audio data to an audio mixing device, so that the audio mixing device mixes the audio data to obtain audio mixed data and forwards the audio mixed data to the transit device and the broadcast proxy device.

The sending unit 122 is further configured to send the video data to a transcoding device, so that the transcoding device processes the video data into a bit stream of at least one level of video quality and forwards the bit stream of at least one level of video quality to the transit device and the broadcast proxy device.

The sending unit 122 is further configured to forward, in a downstream transmission mode notified by the flow control engine device, the bit stream of the corresponding level of video quality and the audio mixed data to the at least one first client terminal.

The broadcast proxy device is a device configured to forward the bit stream of the corresponding level of video quality and the audio mixed data to each second client terminal according to network quality information of the second client terminal.

The specific process of forwarding, by the splitting unit 121 and the sending unit 122, the audio/video data by means of the audio mixing device and the transcoding device may refer to S302 to S306 in the foregoing embodiment corresponding to FIG. 4, and is not further described herein.

The request sending module 14 is configured to send a recording and streaming request to the transcoding device, so that the transcoding device acquires the audio mixed data, encapsulates the audio mixed data and the bit stream of at least one level of video quality into streaming media information, and sends the streaming media information to a recording and storage server and/or a content delivery network (CDN) according to the recording and streaming request.

Optionally, before receiving the audio/video data sent by the target client terminal that is in the target communication channel and has an audio/video upstream authority, the forwarding receiving module 11 is further configured to receive a first access request sent by the target client terminal and complete connection with the target client terminal according to the first access request. The first access request is generated by the target client terminal according to an address of the transit device allocated by a policy service device, and the address of the transit device is allocated by the policy service device when the policy service device detects that the target client terminal has an audio/video upstream authority. Similarly, the access mode of the at least one first client terminal is the same as the access mode of the target client terminal.

By this embodiment of the present disclosure, the original real-time multi-person audio and video call service system may still retain a small room management mode, an upper limit supported by a single room is extended greatly by means of parallel extending, meanwhile impact on the existing architecture is made the smallest, and the risks are controllable. In addition, by means of the functions of the audio mixing device and the transcoding device, the downstream channel quality control capability and the multi-client watching coverage and backend recording capability can be further improved, so as to further guarantee stability of the large scale audio/video call service system.

Figure 9:
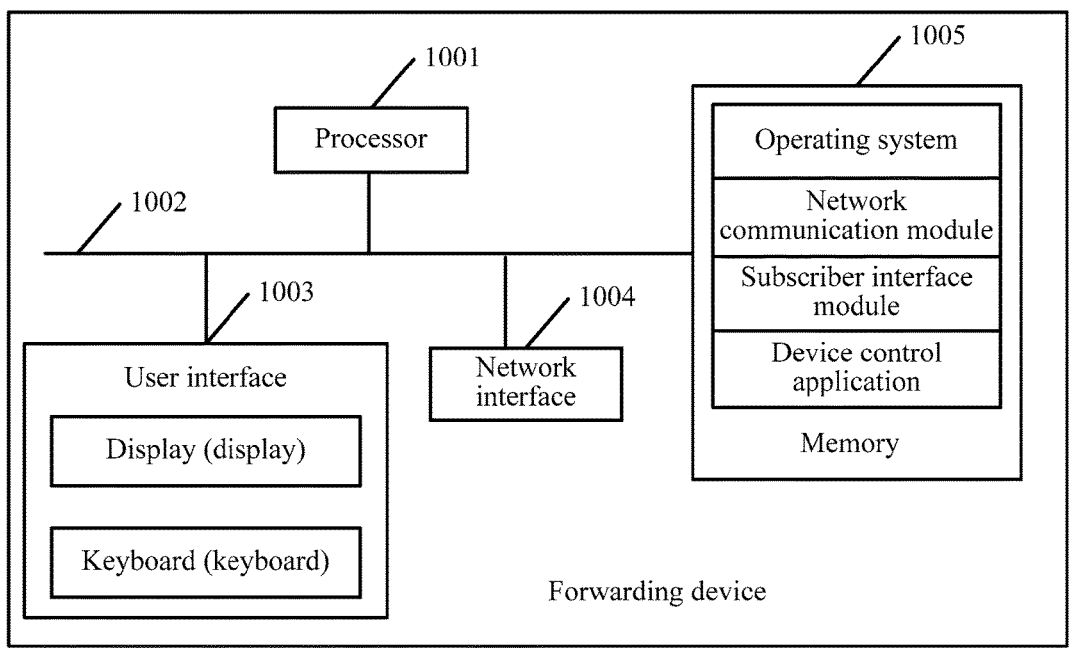
FIG. 9 is a schematic structural diagram of still another transit device according to some embodiments of the present disclosure.

Further referring to FIG. 9, FIG. 9 is a schematic structural diagram of still another transit device according to some embodiments of the present disclosure. As shown in FIG. 9, the transit device may include: at least one processor 1001, for example, a CPU, at least one network interface 1004, a user interface 1003, a memory 1005, and at least one communication bus 1002. The communication bus 1002 is configured to implement connection and communication among the components. The user interface 1003 may include a display or a keyboard. Optionally, the user interface 1003 may also include a standard wired interface or wireless interface. Optionally, the network interface 1004 may include a standard wired interface or wireless interface (for example, a WiFi interface). The memory 1005 may be a high-speed RAM, or may alternatively be a non-volatile memory, for example, at least one magnetic disk memory. Optionally, the memory 1005 may also be at least one storage device far away from the processor 1001. As shown in FIG. 9, the memory 1005 as a computer storage medium may include an operating system, a network communication module, a subscriber interface module, and a device control application.

In the transit device shown in FIG. 9, the network interface 1004 is mainly configured to connect a broadcast proxy device, a flow control engine device, a target client terminal, and a first client terminal. The user interface 1003 is mainly configured to provide an interface for input by a user and acquire data output by the user. The processor 1001 may be configured to invoke a device control application stored in the memory 1005, and specifically perform the following operations:

receiving audio/video data sent by a target client terminal that is in a target communication channel and has an audio/video upstream authority; and forwarding the audio/video data to at least one first client terminal that is in the target communication channel and has an audio/video upstream authority, and to a broadcast proxy device in the target communication channel, so that the broadcast proxy device forwards the audio/video data to each second client terminal in a corresponding downstream transmission mode according to network quality information of each second client terminal of at least one second client terminal.

The at least one second client terminal is a client terminal that is connected to the broadcast proxy device and in the target communication channel and does not have an audio/video upstream authority.

The network quality information of each second client terminal is collected by the broadcast proxy device in advance.

In an embodiment, the processor 1001 further performs the following operations:

receiving client change information sent by a flow control engine device when the audio/video upstream authority of the target client terminal is canceled, or the first client terminal starts to upload the audio/video data, or the changed second client terminal starts to upload the audio/video data, the client change information being state change information of a client terminal having an audio/video upstream authority; and forwarding the client change information to the target client terminal, the at least one first client terminal, and the changed second client terminal.

The changed second client terminal is a second client terminal for which an audio/video upstream authority is allocated.

In an embodiment, the processor 1001 further performs the following operation:

maintaining at least one audio/video call channel and storing a broadcast proxy device list respectively corresponding to each audio/video call channel of the at least one audio/video call channel.

The at least one audio/video call channel includes at least the target communication channel, and the broadcast proxy device list includes an address of the broadcast proxy device.

In an embodiment, when forwarding the audio/video data to at least one first client terminal that is in the target communication channel and has an audio/video upstream authority, and to a broadcast proxy device in the target communication channel, so that the broadcast proxy device forwards the audio/video data to each second client terminal in a corresponding downstream transmission mode according to network quality information of each second client terminal of at least one second client terminal, the processor 1001 specifically performs the following operations:

splitting the audio/video data into audio data and video data;

sending the audio data to an audio mixing device, so that the audio mixing device mixes the audio data to obtain audio mixed data and forwards the audio mixed data to the transit device and the broadcast proxy device;

sending the video data to a transcoding device, so that the transcoding device processes the video data into a bit stream of at least one level of video quality and forwards the bit stream of at least one level of video quality to the transit device and the broadcast proxy device; and forwarding, in a downstream transmission mode notified by the flow control engine device, the bit stream of the corresponding level of video quality and the audio mixed data to the at least one first client terminal.

The broadcast proxy device is a device configured to forward the bit stream of the corresponding level of video quality and the audio mixed data to each second client terminal according to network quality information of the second client terminal.

In an embodiment, the processor 1001 further performs the following operation:

sending a recording and streaming request to the transcoding device, so that the transcoding device acquires the audio mixed data, encapsulates the audio mixed data and the bit stream of at least one level of video quality into streaming media information, and sends the streaming media information to a recording and storage server and/or a content delivery network (CDN) according to the recording and streaming request.

In the embodiments of the present disclosure, a plurality of first client terminals that has an audio/video upstream authority and a target client terminal that has an audio/video upstream authority are connected to a transit device, and a plurality of second client terminals that does not have an audio/video upstream authority is connected to a broadcast proxy device, so that when the transit device receives audio/video data sent by the target client terminal, the transit device may respectively forward the audio/video data to each first client terminal and the broadcast proxy device, and the broadcast proxy device further forwards the obtained audio/video data to the second client terminals. Since the second client terminals are all managed by the broadcast proxy device, load of a network control policy system and a data forwarding system can be greatly reduced when a quantity of the second client terminals becomes relatively huge, thereby guaranteeing stability of a super large scale audio/video call service system.

Figure 10:
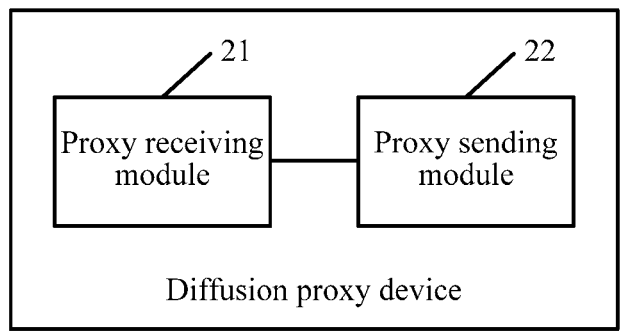
FIG. 10 is a schematic structural diagram of a broadcast proxy device according to some embodiments of the present disclosure.

Referring to FIG. 10, FIG. 10 is a schematic structural diagram of a broadcast proxy device according to some embodiments of the present disclosure. The broadcast proxy device may include a proxy receiving module 21 and a proxy sending module 22.

The proxy receiving module 21 is configured to receive audio/video data sent by a transit device, the audio/video data being data sent to the transit device by a target client terminal that is in a target communication channel and has an audio/video upstream authority, and the broadcast proxy device being connected to at least one second client terminal that is in the target communication channel and does not have an audio/video upstream authority.

The proxy sending module 22 is configured to forward the audio/video data to each second client terminal in a corresponding downstream transmission mode according to network quality information of the second client terminal, the network quality information of each second client terminal being collected by the broadcast proxy device in advance.

The transit device is a device configured to forward the audio/video data to at least one first client terminal that is in the target communication channel and has an audio/video upstream authority and to the broadcast proxy device in the target communication channel.

The specific implementation manner of the proxy receiving module 21 and the proxy sending module 22 may refer to the description of the broadcast proxy device in the foregoing embodiment corresponding to FIG. 2 or the description of the broadcast proxy device in the foregoing embodiment corresponding to FIG. 3, and is not further described herein.

In the embodiments of the present disclosure, a plurality of first client terminals that has an audio/video upstream authority and a target client terminal that has an audio/video upstream authority are connected to a transit device, and a plurality of second client terminals that does not have an audio/video upstream authority is connected to a broadcast proxy device, so that when the transit device receives audio/video data sent by the target client terminal, the transit device may respectively forward the audio/video data to each first client terminal and the broadcast proxy device, and the broadcast proxy device further forwards the obtained audio/video data to the second client terminals. Since the second client terminals are all managed by the broadcast proxy device, load of a network control policy system and a data forwarding system can be greatly reduced when a quantity of the second client terminals becomes relatively huge, thereby guaranteeing stability of a super large scale audio/video call service system.

Figure 11:
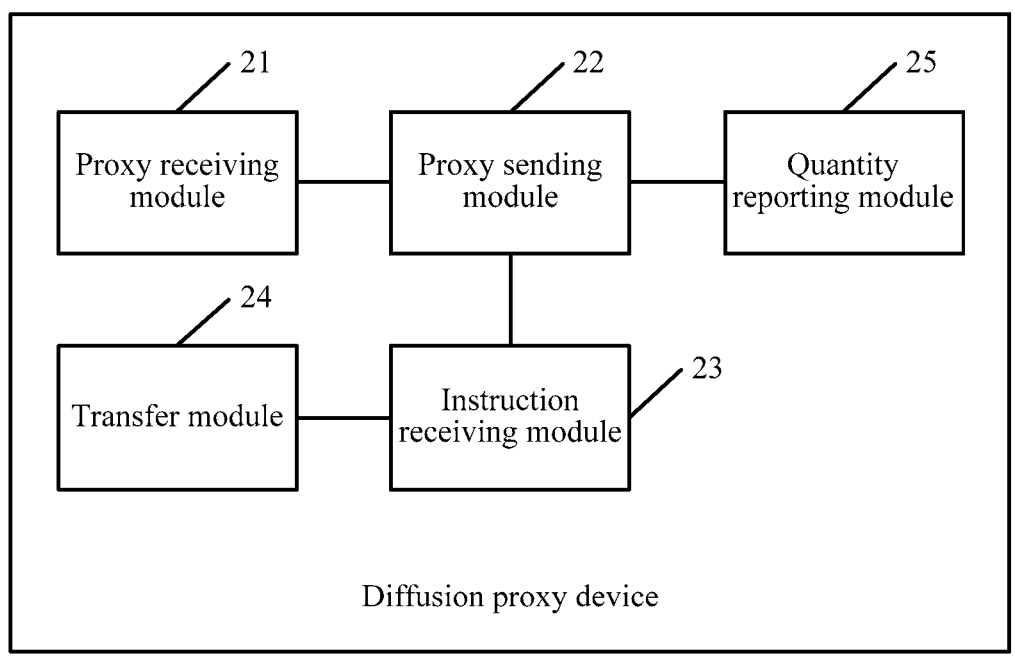
FIG. 11 is a schematic structural diagram of another broadcast proxy device according to some embodiments of the present disclosure.

Referring to FIG. 11, FIG. 11 is a schematic structural diagram of another broadcast proxy device according to some embodiments of the present disclosure. The broadcast proxy device may include the proxy receiving module 21 and the proxy sending module 22 in the foregoing embodiment corresponding to FIG. 10. Further, the broadcast proxy device may also include: an instruction receiving module 23, a transfer module 24, and a quantity reporting module 25.

The instruction receiving module 23 is configured to receive a redirection instruction sent by a flow control engine device when there is a second client terminal for which an audio/video upstream authority is allocated among the at least one second client terminal.

The transfer module 24 is configured to transfer an access service of the changed second client terminal to the transit device in the target communication channel according to the redirection instruction.

The quantity reporting module 25 is configured to report to the flow control engine device a total quantity of second client terminals after change if a total quantity of the at least one second client terminal changes, so that the flow control engine device calculates a total quantity of client terminals in the target communication channel according to the reported total quantity of second client terminals and a total quantity of the target client terminals and the at least one first client terminal.

The specific implementation manner of the instruction receiving module 23 and the transfer module 24 may refer to S205 and S206 in the foregoing embodiment corresponding to FIG. 3, and is not further described herein. The specific implementation manner of the quantity reporting module 25 may refer to S207 and S208 in the foregoing embodiment corresponding to FIG. 3, and is not further described herein.

Optionally, the proxy receiving module 21 is further configured to receive client change information sent by the flow control engine device when the audio/video upstream authority of the target client terminal is canceled, or the first client terminal starts to upload the audio/video data, or the changed second client terminal starts to upload the audio/video data, the client change information being state change information of a client terminal having an audio/video upstream authority.

The proxy sending module 22 is further configured to forward the client change information to the at least one second client terminal.

The process of forwarding the client change information performed by the proxy receiving module 21 and the proxy sending module 22 may specifically refer to S209 to S213 in the foregoing embodiment corresponding to FIG. 3, and is not further described herein.

Optionally, when the transit device splits the audio/video data into audio data and video data rather than directly forward the audio/video data to the broadcast proxy device, the transit device may send the audio data to an audio mixing device, so that the audio mixing device mixes the audio data to obtain audio mixed data and forwards the audio mixed data to the transit device and the broadcast proxy device. The transit device may also send the video data to a transcoding device, so that the transcoding device processes the video data into a bit stream of at least one level of video quality and forwards the bit stream of at least one level of video quality to the transit device and the broadcast proxy device. After the proxy receiving module 21 receives the audio mixed data and the bit stream of at least one level of video quality, the proxy sending module 22 may forward the bit stream of the corresponding level of video quality and the audio mixed data to each second client terminal according to the network quality information of each second client terminal of the at least one second client terminal. The transit device may also forward, in a downstream transmission mode notified by the flow control engine device, the bit stream of the corresponding level of video quality and the audio mixed data to the at least one first client terminal.

Optionally, before the proxy receiving module 21 receives the audio/video data sent by the transit device, the proxy receiving module 21 may also receive a second access request sent by each second client terminal and complete connection with each second client terminal according to the second access request, the second access request being generated by each second client terminal according to an address of the broadcast proxy device allocated by a policy service device, and the address of the broadcast proxy device being allocated by the policy service device when the policy service device detects that each second client terminal does not have an audio/video upstream authority.

In the embodiments of the present disclosure, a plurality of first client terminals that has an audio/video upstream authority and a target client terminal that has an audio/video upstream authority are connected to a transit device, and a plurality of second client terminals that does not have an audio/video upstream authority is connected to a broadcast proxy device, so that when the transit device receives audio/video data sent by the target client terminal, the transit device may respectively forward the audio/video data to each first client terminal and the broadcast proxy device, and the broadcast proxy device further forwards the obtained audio/video data to the second client terminals. Since the second client terminals are all managed by the broadcast proxy device, load of a network control policy system and a data forwarding system can be greatly reduced when a quantity of the second client terminals becomes relatively huge, thereby guaranteeing stability of a super large scale audio/video call service system.

Figure 12:
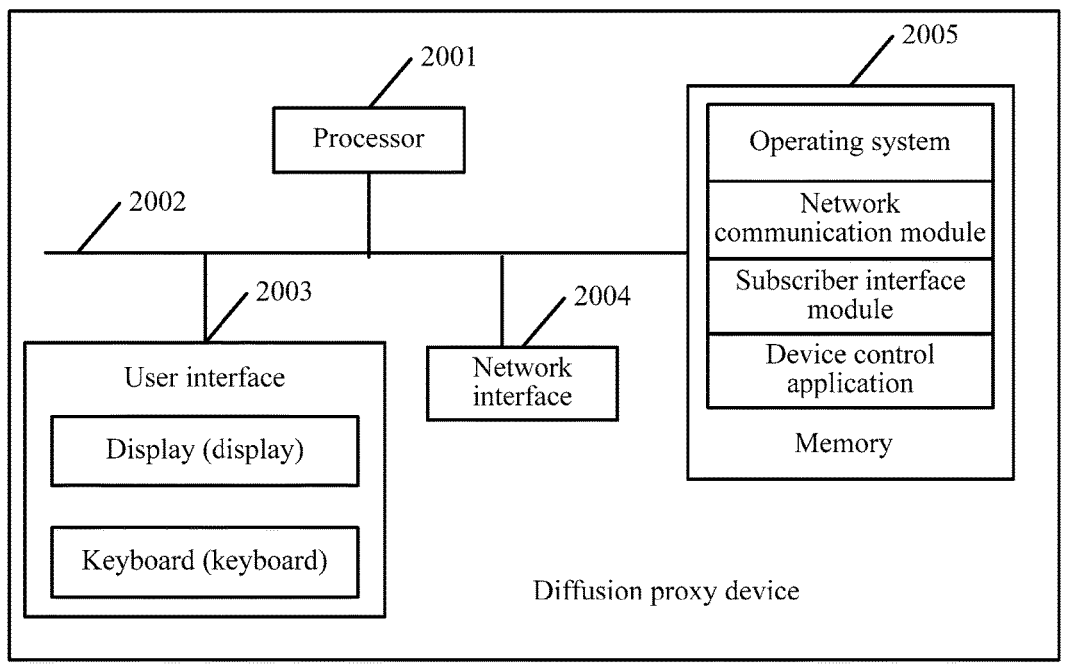
FIG. 12 is a schematic structural diagram of still another broadcast proxy device according to some embodiments of the present disclosure.

Further referring to FIG. 12, FIG. 12 is a schematic structural diagram of still another broadcast proxy device according to some embodiments of the present disclosure. As shown in FIG. 12, the broadcast proxy device may include: at least one processor 2001, for example, a CPU, at least one network interface 2004, a user interface 2003, a memory 2005, and at least one communication bus 2002. The communication bus 2002 is configured to implement connection and communication among the components. The user interface 2003 may include a display or a keyboard. Optionally, the user interface 2003 may also include a standard wired interface or wireless interface. Optionally, the network interface 2004 may include a standard wired interface or wireless interface (for example, a WiFi interface). The memory 2005 may be a high-speed RAM, or may alternatively be a non-volatile memory, for example, at least one magnetic disk memory. Optionally, the memory 2005 may also be at least one storage device far away from the processor 2001. As shown in FIG. 12, the memory 2005 as a computer storage medium may include an operating system, a network communication module, a subscriber interface module, and a device control application.

In the broadcast proxy device shown in FIG. 12, the network interface 2004 is mainly configured to connect a transit device, a flow control engine device, and a second client terminal. The user interface 2003 is mainly configured to provide an interface for input by a user and acquire data output by the user. The processor 2001 may be configured to invoke a device control application stored in the memory 2005, and specifically perform the following operations:

receiving audio/video data sent by a transit device, the audio/video data being data sent to the transit device by a target client terminal that is in a target communication channel and has an audio/video upstream authority, and the broadcast proxy device being connected to at least one second client terminal that is in the target communication channel and does not have an audio/video upstream authority; and forwarding the audio/video data to each second client terminal in a corresponding downstream transmission mode according to network quality information of the second client terminal, the network quality information of each second client terminal being collected by the broadcast proxy device in advance.

The transit device is a device configured to forward the audio/video data to at least one first client terminal that is in the target communication channel and has an audio/video upstream authority and to the broadcast proxy device in the target communication channel.

In an embodiment, the processor 2001 further performs the following operations:

receiving a redirection instruction sent by the flow control engine device when there is a second client terminal for which an audio/video upstream authority is allocated among the at least one second client terminal; and transferring an access service of the changed second client terminal to the transit device in the target communication channel according to the redirection instruction.

In an embodiment, the processor 2001 further performs the following operation:

reporting to the flow control engine device a total quantity of second client terminals after change if a total quantity of the at least one second client terminal changes, so that the flow control engine device calculates a total quantity of client terminals in the target communication channel according to the reported total quantity of second client terminals and a total quantity of the target client terminals and the at least one first client terminal.

In an embodiment, the processor 2001 further performs the following operations:

receiving client change information sent by a flow control engine device when the audio/video upstream authority of the target client terminal is canceled, or the first client terminal starts to upload the audio/video data, or the changed second client terminal starts to upload the audio/video data, the client change information being state change information of a client terminal having an audio/video upstream authority; and forwarding the client change information to the at least one second client terminal.

In the embodiments of the present disclosure, a plurality of first client terminals that has an audio/video upstream authority and a target client terminal that has an audio/video upstream authority are connected to a transit device, and a plurality of second client terminals that does not have an audio/video upstream authority is connected to a broadcast proxy device, so that when the transit device receives audio/video data sent by the target client terminal, the transit device may respectively forward the audio/video data to each first client terminal and the broadcast proxy device, and the broadcast proxy device further forwards the obtained audio/video data to the second client terminals. Since the second client terminals are all managed by the broadcast proxy device, load of a network control policy system and a data forwarding system can be greatly reduced when a quantity of the second client terminals becomes relatively huge, thereby guaranteeing stability of a super large scale audio/video call service system.

Figure 13:
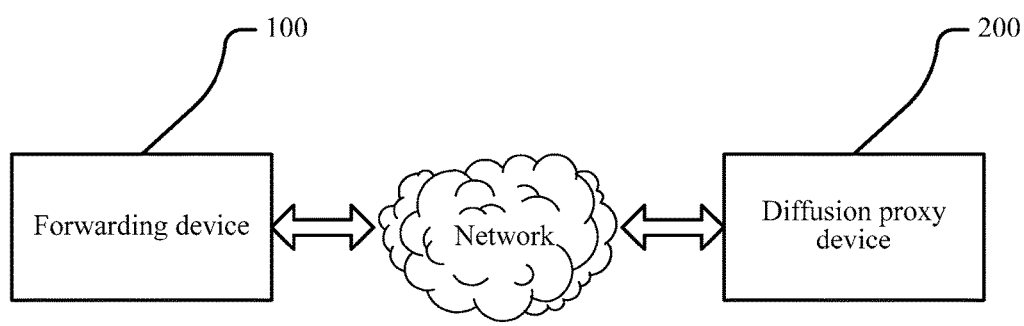
FIG. 13 is a schematic structural diagram of a data transmission system according to some embodiments of the present disclosure.

Referring to FIG. 13, FIG. 13 is a schematic structural diagram of a data transmission system according to some embodiments of the present disclosure. The system may include a transit device 100 and a broadcast proxy device 200.

The transit device 100 is configured to receive audio/video data sent by a target client terminal that is in a target communication channel and has an audio/video upstream authority.

The transit device 100 is further configured to forward the audio/video data to at least one first client terminal that is in the target communication channel and has an audio/video upstream authority, and to a broadcast proxy device 200 in the target communication channel, the broadcast proxy device being connected to at least one second client terminal that is in the target communication channel and does not have an audio/video upstream authority 200.

The broadcast proxy device 200 is configured to forward the audio/video data to each second client terminal in a corresponding downstream transmission mode according to network quality information of the second client terminal, the network quality information of each second client terminal being collected by the broadcast proxy device 200 in advance.

The broadcast proxy device 200 is further configured to receive a redirection instruction sent by a flow control engine device when there is a second client terminal for which an audio/video upstream authority is allocated among the at least one second client terminal.

The broadcast proxy device 200 is further configured to transfer an access service of the changed second client terminal to the transit device 100 in the target communication channel according to the redirection instruction.

The broadcast proxy device 200 is further configured to report to the flow control engine device a total quantity of second client terminals after change if a total quantity of the at least one second client terminal changes, so that the flow control engine device calculates a total quantity of client terminals in the target communication channel according to the reported total quantity of second client terminals and a total quantity of the target client terminals and the at least one first client terminal.

The broadcast proxy device 200 and the transit device 100 each are further configured to receive client change information sent by the flow control engine device when the audio/video upstream authority of the target client terminal is canceled, or the first client terminal starts to upload the audio/video data, or the changed second client terminal starts to upload the audio/video data, the client change information being state change information of a client terminal having an audio/video upstream authority.

The transit device 100 is further configured to forward the client change information to the target client terminal, the at least one first client terminal, and the changed second client terminal.

The broadcast proxy device 200 is further configured to forwarding the client change information to the at least one second client terminal.

The transit device 100 is further configured to maintain at least one audio/video call channel and store a broadcast proxy device list respectively corresponding to each audio/video call channel of the at least one audio/video call channel.

The at least one audio/video call channel includes at least the target communication channel, and the broadcast proxy device list includes an address of the broadcast proxy device.

When forwarding the audio/video data to at least one first client terminal that is in the target communication channel and has an audio/video upstream authority and to the broadcast proxy device 200 in the target communication channel, the transit device 100 is specifically configured to split the audio/video data into audio data and video data, and send the audio data to an audio mixing device, so that the audio mixing device mixes the audio data to obtain audio mixed data and forwards the audio mixed data to the transit device 100 and the broadcast proxy device 200; the transit device 100 is further configured to send the video data to a transcoding device, so that the transcoding device processes the video data into a bit stream of at least one level of video quality and forwards the bit stream of at least one level of video quality to the transit device 100 and the broadcast proxy device 200; and the transit device 100 is further configured to forward, in a downstream transmission mode notified by the flow control engine device, the bit stream of the corresponding level of video quality and the audio mixed data to the at least one first client terminal.

When forwarding the audio/video data to each second client terminal in a corresponding downstream transmission mode according to network quality information of the second client terminal, the broadcast proxy device 200 is specifically configured to forward the bit stream of the corresponding level of video quality and the audio mixed data to each second client terminal according to the network quality information of each second client terminal of the at least one second client terminal.

The transit device 100 is further configured to send a recording and streaming request to the transcoding device, so that the transcoding device acquires the audio mixed data, encapsulates the audio mixed data and the bit stream of at least one level of video quality into streaming media information, and sends the streaming media information to a recording and storage server and/or a content delivery network (CDN) according to the recording and streaming request.

The transit device 100 is further configured to receive a first access request sent by the target client terminal and complete connection with the target client terminal according to the first access request, the first access request being generated by the target client terminal according to an address of the transit device allocated by a policy service device, and the address of the transit device being allocated by the policy service device when the policy service device detects that the target client terminal has an audio/video upstream authority.

The broadcast proxy device 200 is further configured to receive a second access request sent by each second client terminal and complete connection with each second client terminal according to the second access request, the second access request being generated by each second client terminal according to an address of the broadcast proxy device allocated by the policy service device, and the address of the broadcast proxy device being allocated by the policy service device when the policy service device detects that each second client terminal does not have an audio/video upstream authority.

In the embodiments of the present disclosure, a plurality of first client terminals that has an audio/video upstream authority and a target client terminal that has an audio/video upstream authority are connected to a transit device 100, and a plurality of second client terminals that does not have an audio/video upstream authority is connected to a broadcast proxy device 200, so that when the transit device 100 receives audio/video data sent by the target client terminal, the transit device 100 may respectively forward the audio/video data to each first client terminal and the broadcast proxy device 200, and the broadcast proxy device 200 further forwards the obtained audio/video data to the second client terminals. Since the second client terminals are all managed by the broadcast proxy device 200, load of a network control policy system and a data forwarding system can be greatly reduced when a quantity of the second client terminals becomes relatively huge, thereby guaranteeing stability of a super large scale audio/video call service system.

A person of ordinary skill in the art may understand that all or some of the operations of the foregoing embodiments may be implemented by a computer program instructing relevant hardware. The program may be stored in a computer readable storage medium. The program, when being executed, may include the operations of the embodiments in the methods. The storage medium may be a magnetic disk, an optic disc, a read-only memory (ROM), a random access memory (RAM), or the like.

The above descriptions are merely preferred embodiments of the present disclosure, and certainly cannot be used to limit the scope of the claims of the present disclosure. Equivalent changes made according to the claims of the present disclosure still fall within the scope of the present disclosure.

What is claimed is:

1. A data transmission method performed at a data transmission system including a transit device and a broadcast proxy device that is communicatively coupled to the transit device, each device having one or more processors and memory storing one or more programs to be executed by the one or more processors, the method comprising:

receiving, by the broadcast proxy device, audio/video data sent by the transit device, the audio/video data being data sent to the transit device by a target client terminal that is in a target communication channel and has an audio/video upstream authority, and at least one second client terminal that is in the target communication channel and does not have an audio/video upstream authority being connected to the broadcast proxy device;

forwarding, by the broadcast proxy device, the audio/video data to each second client terminal in a corresponding downstream transmission mode according to network quality information of the second client terminal of the at least one second client terminal, the network quality information of the second client terminal being collected by the broadcast proxy device in advance; and the transit device being a device configured to forward the audio/video data to at least one first client terminal that is in the target communication channel and has an audio/video upstream authority and to the broadcast proxy device in the target communication channel.

2. The method according to claim 1, further comprising:
receiving, by the broadcast proxy device, a redirection instruction sent by a flow control engine device when there is a changed second client for which an audio/video upstream authority is allocated among the at least one second client terminal.

3. The method according to claim 2, further comprising:
receiving, by the broadcast proxy device, client change information sent by the flow control engine device when the audio/video upstream authority of the target client terminal is canceled, or the first client starts to upload the audio/video data, or the changed second client starts to upload the audio/video data, the client change information being state change information of a client that has an audio/video upstream authority; and forwarding, by the broadcast proxy device, the client change information to the at least one second client terminal.

4. The method according to claim 1, further comprising:
transferring, by the broadcast proxy device, an access service of the changed second client to the transit device in the target communication channel according to the redirection instruction.

5. The method according to claim 1, further comprising:
forwarding, by the broadcast proxy device, the bit stream of the corresponding level of video quality and the audio mixed data to each second client terminal according to network quality information of the second client terminal.

6. The method according to claim 1, further comprising:
before receiving, by the broadcast proxy device, audio/video data sent by the transit device, the audio/video data being data sent to the transit device by a target client terminal that is in a target communication channel and has an audio/video upstream authority:

receiving, by the transit device, a first access request sent by the target client terminal, and completing, by the transit device, connection with the target client terminal according to the first access request, the first access request being generated by the target client terminal according to an address of the transit device allocated by a policy service device, and the address of the transit device being allocated by the policy service device when the policy service device detects that the target client terminal has an audio/video upstream authority; and receiving, by the broadcast proxy device, a second access request sent by each second client terminal, and completing, by the broadcast proxy device, connection with each second client terminal according to the second access request, the second access request being generated by each second client terminal according to an address of the broadcast proxy device allocated by the policy service device, and the address of the broadcast proxy device being allocated by the policy service device when the policy service device detects that each second client terminal does not have an audio/video upstream authority.

7. The method according to claim 1, further comprising:
reporting, by the broadcast proxy device, to a flow control engine device a total quantity of second clients after change if a total quantity of the at least one second client terminal changes, so that the flow control engine device calculates a total quantity of clients in the target communication channel according to the reported total quantity of second clients and a statistic total quantity of the target client terminals and the at least one first client terminal.

8. A data transmission system including a transit device and a broadcast proxy device that is communicatively coupled to the transit device, each device having one or more processors, memory and one or more programs stored in the memory that, when executed by the one or more processors, cause the data transmission system to perform a plurality of operations including:
receiving, by the broadcast proxy device, audio/video data sent by the transit device, the audio/video data being data sent to the transit device by a target client terminal that is in a target communication channel and has an audio/video upstream authority, and at least one second client terminal that is in the target communication channel and does not have an audio/video upstream authority being connected to the broadcast proxy device;

forwarding, by the broadcast proxy device, the audio/video data to each second client terminal in a corresponding downstream transmission mode according to network quality information of the second client terminal of the at least one second client terminal, the network quality information of the second client terminal being collected by the broadcast proxy device in advance; and the transit device being a device configured to forward the audio/video data to at least one first client terminal that is in the target communication channel and has an audio/video upstream authority and to the broadcast proxy device in the target communication channel.

9. The data transmission system according to claim 8, wherein the plurality of operations further comprise:
receiving, by the broadcast proxy device, a redirection instruction sent by a flow control engine device when there is a changed second client for which an audio/video upstream authority is allocated among the at least one second client terminal.

10. The data transmission system according to claim 9, wherein the plurality of operations further comprise:
receiving, by the broadcast proxy device, client change information sent by the flow control engine device when the audio/video upstream authority of the target client terminal is canceled, or the first client starts to upload the audio/video data, or the changed second client starts to upload the audio/video data, the client change information being state change information of a client that has an audio/video upstream authority; and
forwarding, by the broadcast proxy device, the client change information to the at least one second client terminal.

11. The data transmission system according to claim 8, wherein the plurality of operations further comprise:
transferring, by the broadcast proxy device, an access service of the changed second client to the transit device in the target communication channel according to the redirection instruction.

12. The data transmission system according to claim 8, wherein the plurality of operations further comprise:
forwarding, by the broadcast proxy device, the bit stream of the corresponding level of video quality and the audio mixed data to each second client terminal according to network quality information of the second client terminal.

13. The data transmission system according to claim 8, wherein the plurality of operations further comprise:
before receiving, by the broadcast proxy device, audio/video data sent by the transit device, the audio/video data being data sent to the transit device by a target client terminal that is in a target communication channel and has an audio/video upstream authority:
receiving, by the transit device, a first access request sent by the target client terminal, and completing, by the transit device, connection with the target client terminal according to the first access request, the first access request being generated by the target client terminal according to an address of the transit device allocated by a policy service device, and the address of the transit device being allocated by the policy service device when the policy service device detects that the target client terminal has an audio/video upstream authority; and receiving, by the broadcast proxy device, a second access request sent by each second client terminal, and completing, by the broadcast proxy device, connection with each second client terminal according to the second access request, the second access request being generated by each second client terminal according to an address of the broadcast proxy device allocated by the policy service device, and the address of the broadcast proxy device being allocated by the policy service device when the policy service device detects that each second client terminal does not have an audio/video upstream authority.

14. The data transmission system according to claim 8, wherein the plurality of operations further comprise:
reporting, by the broadcast proxy device, to a flow control engine device a total quantity of second clients after change if a total quantity of the at least one second client terminal changes, so that the flow control engine device calculates a total quantity of clients in the target communication channel according to the reported total quantity of second clients and a statistic total quantity of the target client terminals and the at least one first client terminal.

15. A non-transitory computer readable storage medium storing one or more programs, wherein the one or more programs, when executed by a data transmission system comprising a transit device and a broadcast proxy device that is communicatively coupled to the transit device, cause the data transmission system to perform a plurality of operations including:

receiving, by the transit device, audio/video data sent by a target client terminal that is in a target communication channel and has an audio/video upstream authority;

forwarding, by the transit device, the audio/video data to at least one first client terminal that is in the target communication channel and has an audio/video upstream authority;

forwarding, by the transit device, the audio/video data to the broadcast proxy device in the target communication channel, the broadcast proxy device being connected to at least one second client terminal that is in the target communication channel and does not have an audio/video upstream authority; and forwarding, by the broadcast proxy device, the audio/video data to each second client terminal in a corresponding downstream transmission mode according to network quality information of the second client terminal, the network quality information of each second client terminal being collected by the broadcast proxy device in advance;

receiving, by the broadcast proxy device, audio/video data sent by the transit device, the audio/video data being data sent to the transit device by a target client terminal that is in a target communication channel and has an audio/video upstream authority, and at least one second client terminal that is in the target communication channel and does not have an audio/video upstream authority being connected to the broadcast proxy device;

forwarding, by the broadcast proxy device, the audio/video data to each second client terminal in a corresponding downstream transmission mode according to network quality information of the second client terminal of the at least one second client terminal, the network quality information of the second client terminal being collected by the broadcast proxy device in advance; and the transit device being a device configured to forward the audio/video data to at least one first client terminal that is in the target communication channel and has an audio/video upstream authority and to the broadcast proxy device in the target communication channel.

16. The non-transitory computer readable storage medium according to claim 15, wherein the plurality of operations further comprise:

receiving, by the broadcast proxy device, a redirection instruction sent by a flow control engine device when there is a changed second client for which an audio/video upstream authority is allocated among the at least one second client terminal.

17. The non-transitory computer readable storage medium according to claim 16, wherein the plurality of operations further comprise:

receiving, by the broadcast proxy device, client change information sent by the flow control engine device when the audio/video upstream authority of the target client terminal is canceled, or the first client starts to upload the audio/video data, or the changed second client starts to upload the audio/video data, the client change information being state change information of a client that has an audio/video upstream authority; and forwarding, by the broadcast proxy device, the client change information to the at least one second client terminal.

18. The non-transitory computer readable storage medium according to claim 15, wherein the plurality of operations further comprise:

transferring, by the broadcast proxy device, an access service of the changed second client to the transit device in the target communication channel according to the redirection instruction.

19. The non-transitory computer readable storage medium according to claim 15, wherein the plurality of operations further comprise:

forwarding, by the broadcast proxy device, the bit stream of the corresponding level of video quality and the audio mixed data to each second client terminal according to network quality information of the second client terminal.

20. The non-transitory computer readable storage medium according to claim 15, wherein the plurality of operations further comprise:

reporting, by the broadcast proxy device, to a flow control engine device a total quantity of second clients after change if a total quantity of the at least one second client terminal changes, so that the flow control engine device calculates a total quantity of clients in the target communication channel according to the reported total quantity of second clients and a statistic total quantity of the target client terminals and the at least one first client terminal.

\* \* \* \* \*